(12) United States Patent
Laukhuf et al.

(10) Patent No.: US 6,357,199 B2
(45) Date of Patent: Mar. 19, 2002

(54) ELECTRICAL SYSTEM MOUNTING ASSEMBLY

(75) Inventors: Gregg E. Laukhuf, Bryan, OH (US); Raymond H. Riner, LaGrange, IN (US)

(73) Assignee: Dekko Engineering, Inc., Kendallville, IN (US)

( * ) Notice: Subject to any disclaimer, the term of this patent is extended or adjusted under 35 U.S.C. 154(b) by 0 days.

(21) Appl. No.: 09/899,613

(22) Filed: Jul. 5, 2001

Related U.S. Application Data

(63) Continuation of application No. 09/363,962, filed on Jul. 29, 1999, now Pat. No. 6,256,950.

(51) Int. Cl.$^7$ ................................................. E04H 1/00
(52) U.S. Cl. ..................... 52/741.1; 52/239; 52/36.1; 52/220.7; 52/242; 248/300
(58) Field of Search ............................. 52/36.1, 230.7, 52/241, 242, 238.1, 239, 290, 481.2, 126.2, 741.1; 248/300, 188, 188.1

(56) References Cited

U.S. PATENT DOCUMENTS

| | | |
|---|---|---|
| 2,223,680 A | 12/1940 | Fischer et al. |
| 2,270,796 A | 1/1942 | Hauser |
| 2,729,411 A | 1/1956 | Cahill |
| 2,766,959 A | 10/1956 | Duncan |
| 2,916,234 A | 12/1959 | Bogar, Jr. |
| 3,064,724 A | 11/1962 | Nowell |
| 3,094,305 A | 6/1963 | Lohrman |
| 3,337,172 A | 8/1967 | Jackson |
| 4,158,936 A | 6/1979 | Fulton |
| 4,417,373 A | 11/1983 | Keglewitsch |
| 4,593,505 A | 6/1986 | Russell |
| 4,993,205 A | 2/1991 | Dull et al. |
| 5,214,889 A | 6/1993 | Nienhuis et al. |
| 5,267,714 A | 12/1993 | Nelson, II |
| 5,381,994 A | 1/1995 | Welch |
| 5,806,258 A | 9/1998 | Miedema et al. |
| 6,021,613 A | 2/2000 | Reuter et al. |

Primary Examiner—Carl D. Friedman
Assistant Examiner—Brian E. Glessner
(74) Attorney, Agent, or Firm—Taylor & Aust, P.C.

(57) ABSTRACT

Method of and apparatus for supporting and stabilizing elongated electrical distribution units intermediate first and second elongated generally parallel channels within modular furniture by fixing a plurality of spaced legs to the distribution units with each leg extending transversely to, and in generally the same direction from each distribution unit. A portion of each distribution engages the first channel and a plurality of mounting brackets are disposed intermediate the distribution unit and the second channel with each mounting bracket located adjacent to a corresponding leg. Each leg is fastened to the adjacent bracket at a generally central location of the adjacent bracket when the spacing between the first and second elongated members is near a preferred minimum distance, while each leg is fastened to the adjacent bracket near one end of the bracket when the spacing between the first and second elongated members is near a preferred maximum distance. The brackets are disposed generally parallel to the first and second channels when the channel separation is near the preferred minimum distance and are disposed generally orthogonal to the direction of elongation of the first and second channels when the channel separation is near the preferred maximum distance. In one application, a plurality of U-shaped adapters are located intermediate each bracket and the second channel to adapt the bracket lower end configuration to the contour of the second channel.

3 Claims, 5 Drawing Sheets

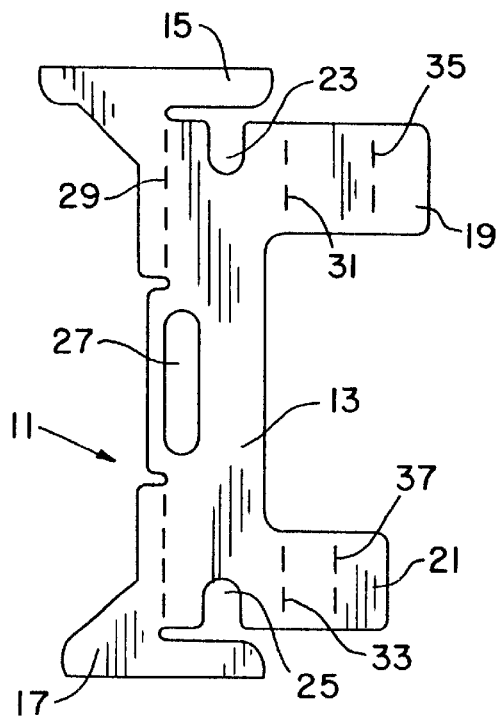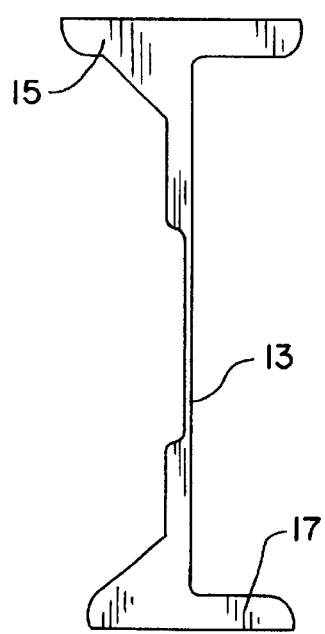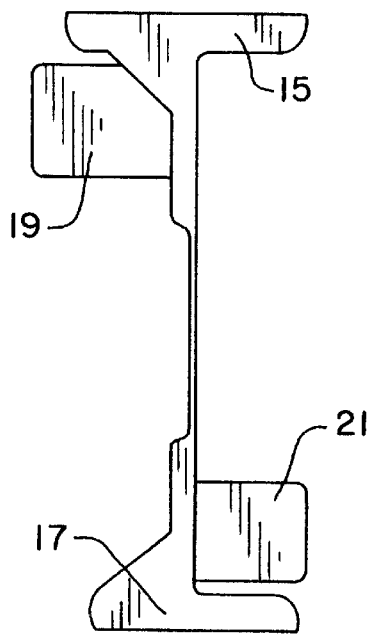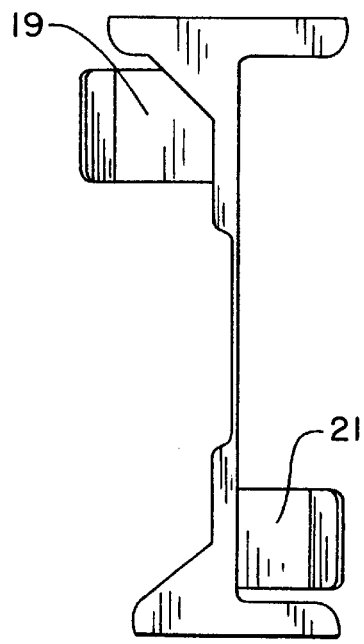
Fig. 1
Fig. 2
Fig. 3
Fig. 4

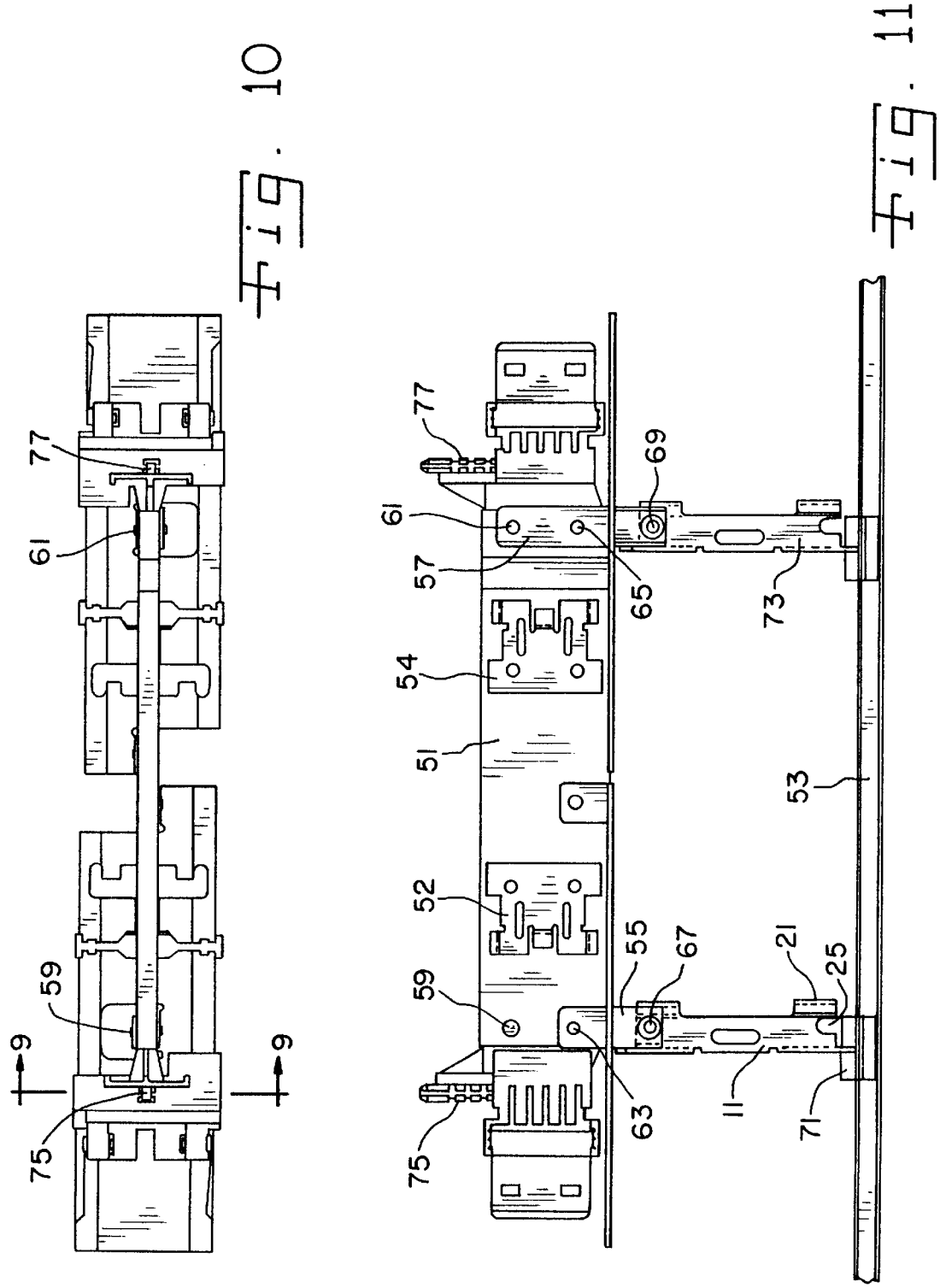

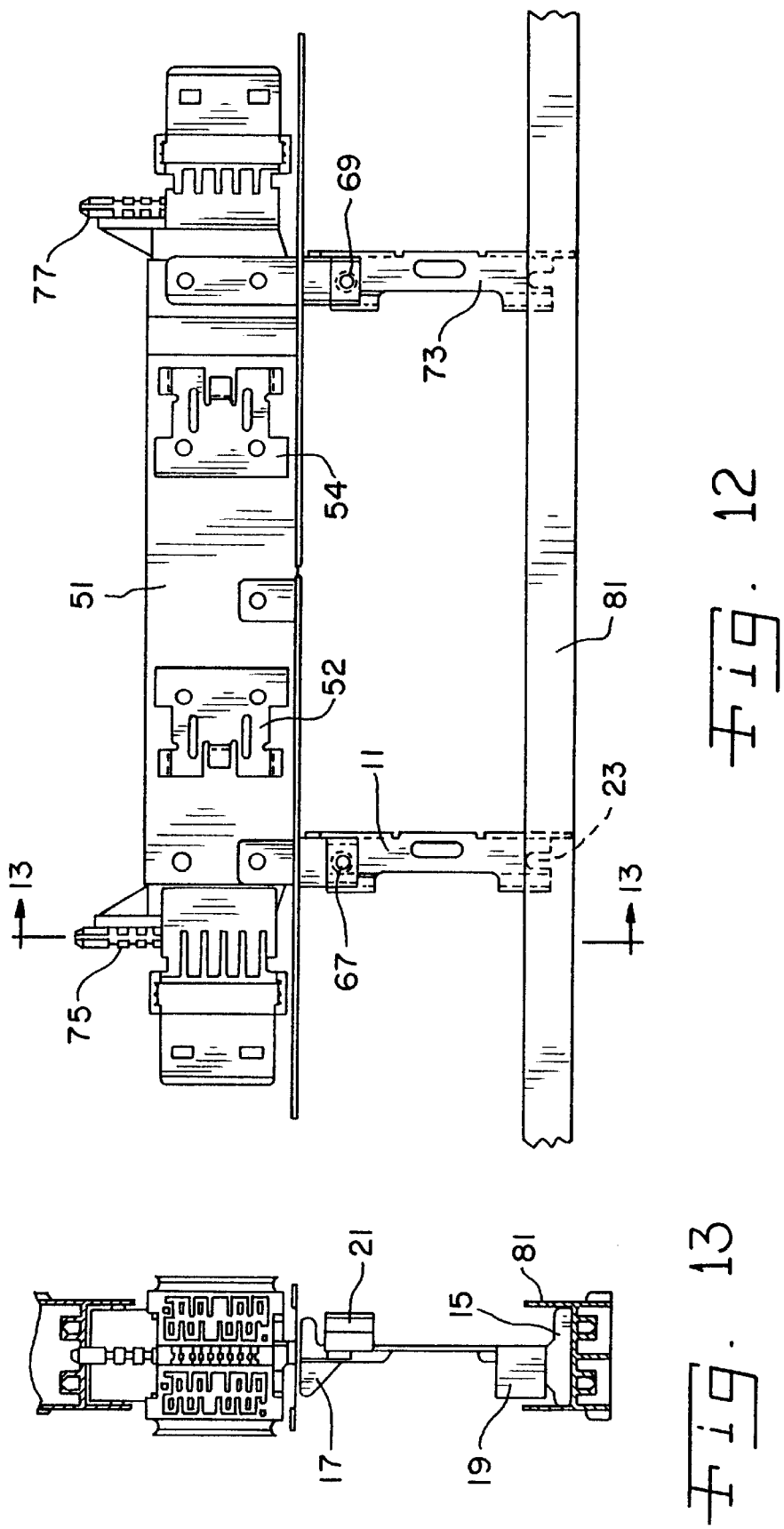

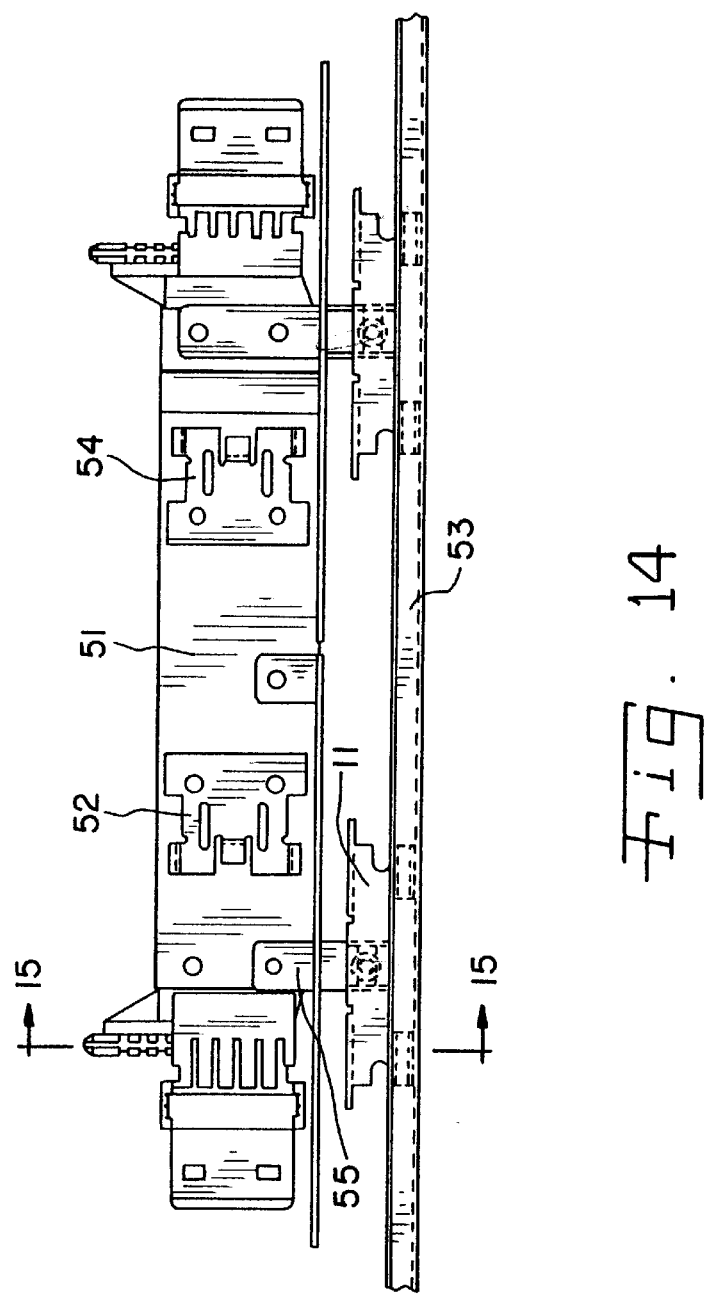
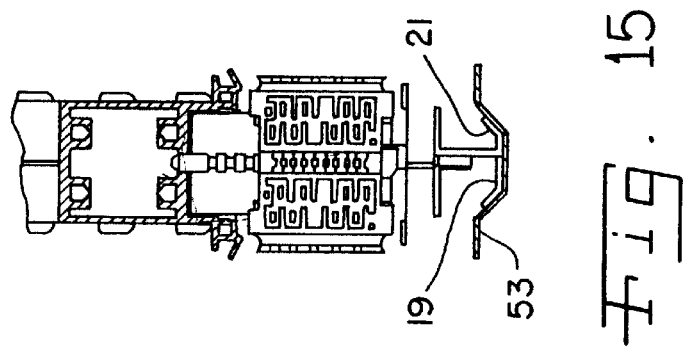

ELECTRICAL SYSTEM MOUNTING ASSEMBLY

This is a continuation of application Ser. No. 09/363,962 filed Jul. 29, 1999, now U.S. Pat. No. 6,256,950.

BACKGROUND OF THE INVENTION

1. Field of the Invention

The present invention relates generally to power distribution systems of the modular type which are incorporated into or used in conjunction with prefabricated and prewired office partitions or room divider panels and other modular furniture.

2. Description of the Related Art

Prewired office partitions and similar modular furnishings with power and/or communications wiring running in raceways along the top or bottom of the partitions have been known for a number of years. One known technique for mounting such wiring is to suspend power distribution units beneath a horizontally extending channel within the partition, for example, by spring clips that latch into corresponding square channel holes. There is no support on the bottom of the distribution. This results in the distribution rocking back and forth, using the spring clip as the pivot point, when plugs are inserted and withdrawn from the receptacles.

SUMMARY OF THE INVENTION

The present invention provides a mounting bracket design which prohibits the distribution from rocking. The top of the distribution is molded with a tower that is inserted into the 0.25" square channel hole. This locates the distribution in the correct spot on the channel and prevents lateral movement at the top of the distribution. The distribution is held in the correct vertical position by using a screw to secure the universal mounting bracket to a leg which is riveted to the distribution. In addition to securing the distribution vertically, this also prohibits any lateral movement at the bottom of the distribution. The universal mounting bracket can be oriented in one of three ways to accommodate any of the three mounting locations. The result for the end user is a more secure mounting method that prevents excessive movement of the receptacles when plugging in and unplugging.

The invention comprises, in one form thereof, a support and transverse stabilization system for utility distribution units to be suspended in either of two elevational positions intermediate at least two generally horizontal elongated channels located within modular room divider panels. A plurality of legs are fixed to and extend laterally from each distribution unit and joined to a like plurality of brackets. Each bracket has at least two separate leg attachment locations for receiving corresponding threaded fasteners for joining a leg end to a bracket in either of at least two separate locations and each bracket includes at least two channel engaging feet with one foot extending from the bracket in a direction opposite the leg when the leg and bracket are joined in one location to engage the lower channel and the other foot extending from the bracket in a direction opposite the leg when the leg and bracket are joined in the other location to engage the lower channel.

An advantage of the present invention is that the same mounting bracket assembly may be used in a variety of different mounting configurations.

Another advantage is the reduction or elimination of pivotal motion when plugging into or unplugging from a utility distribution unit supported and stabilized according to the present invention.

A further advantage is the quick, easy and rigid support of electrical or other utility distribution units at any one of several possible elevations.

BRIEF DESCRIPTION OF THE DRAWINGS

The above-mentioned and other features and advantages of this invention, and the manner of attaining them, will become more apparent and the invention will be better understood by reference to the following description of (an) embodiment(s) of the invention taken in conjunction with the accompanying drawings, wherein:

FIG. 1 is a plan view of a channel bracket blank according to the invention in one form;

FIG. 2 is a plan view of the channel bracket of FIG. 1 after a first deformation;

FIG. 3 is a plan view of the channel bracket of FIG. 1 after a second deformation;

FIG. 4 is a plan view of the channel bracket of FIG. 1 after a third deformation;

FIG. 10 is a top plan view of the system of FIG. 9;

FIG. 11 is a side elevation view of the system of FIGS. 9 and 10 with the upper channel omitted;

FIG. 12 is a side elevation view similar to FIG. 11, but showing distribution unit stabilization at a different elevational position;

FIG. 13 is an end view partially in cross-section of the distribution unit stabilizing system of FIG. 12;

FIG. 14 is a side elevation view similar to FIGS. 11 and 12, but showing distribution unit stabilization at yet another elevational position; and FIG. 15 is an end view partially in cross-section of the distribution unit stabilizing system of FIG. 14.

Figure 5:
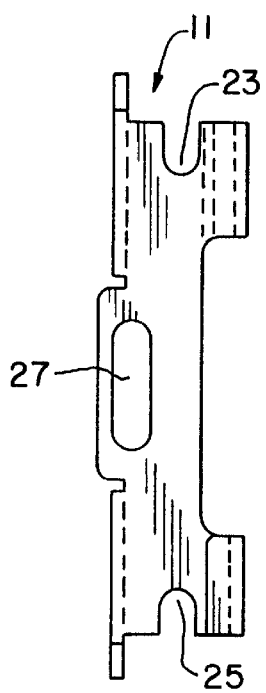
FIG. 5 is a side elevation view of the channel bracket of FIG. 4

Corresponding reference characters indicate corresponding parts throughout the several views. The exemplification(s) set out herein illustrates one preferred embodiment of the invention, in one form, and such exemplification(s) is(are) not to be construed as limiting the scope of the invention in any manner.

DETAILED DESCRIPTION OF THE INVENTION

Referring now to the drawings and particularly to FIG. 1, there is shown a bracket blank 11 cut from a planar sheet of metal to be formed into a mounting bracket for facilitating the support of an electrical distribution unit. The blank 11 has a generally elongated channel body 13 having a vertical axis of elongation as viewed, a first channel engaging foot 15 near one channel body end, a second channel engaging foot 17 near an opposite channel body end, and first and second arms 19 and 21 extending transversely from the same side of the channel body 13 intermediate the first foot 15 and second foot 17. Leg attachment openings such as open-ended slots 23 and 25, and elongated aperture 27 may also be formed in the blank 11. The use of slots rather than circular holes facilitates rapid assembly later.

The blank is then bent along dotted line 29 to deform the feet 15 and 17 from the plane of the body into a plane generally orthogonal to the plane of the body as seen in FIG. 2 where the feet 15 and 17 lie in the plane of the drawing while the body 13 and the plane of the remaining sheet of metal now extend perpendicular to the plane of the drawing. Arms 19 and 21 are next bent along lines 31 and 33 in opposite directions from the plane of the body 13 and into a plane generally orthogonal thereto to again be visible as seen in FIG. 3. Finally, the free ends of the arms 17 and 19 are further bent along lines 35 and 37 toward the plane of the feet 15 and 17 to form a pair of channel engaging pads. Clearly, the sequence of bending may be varied or several of the bends may be performed contemporaneously as desired. The completed bracket is shown in FIGS. 4 and 5. Note, in FIG. 1, the dotted lines represent lines along which the blank is to be deformed while in FIG. 5, the dotted lines represent hidden lines of the completed bracket.

Figure 6:
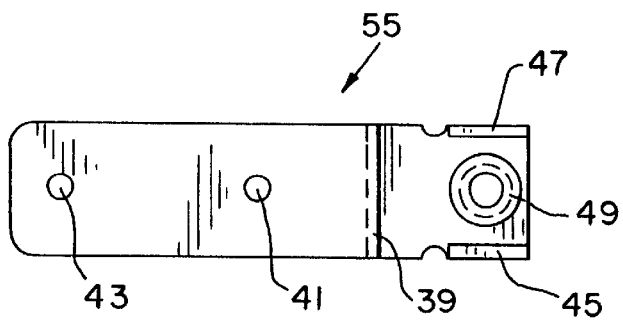
FIG. 6 is a plan view of a leg for interconnecting a distribution unit and bracket.
Figure 7:
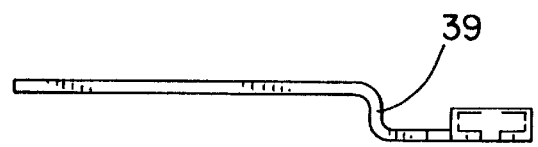
FIG. 7 is a side elevation view of the leg of FIG. 6.
Figure 8:
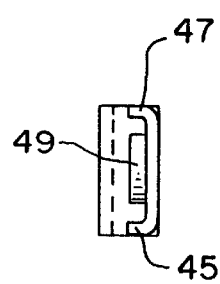
FIG. 8 is an end elevation view of the leg of FIGS. 6 and 7.

In FIGS. 6–8, the leg portion 55 of the bracket assembly is cut from a similar sheet of metal and provided with an offset bend 39 and a pair of rivet accepting apertures 41 and 43. A threaded insert 49 is crimped to the leg and two tabs 45 and 47 are bent to extend coextensive with the insert 49.

Figure 9:
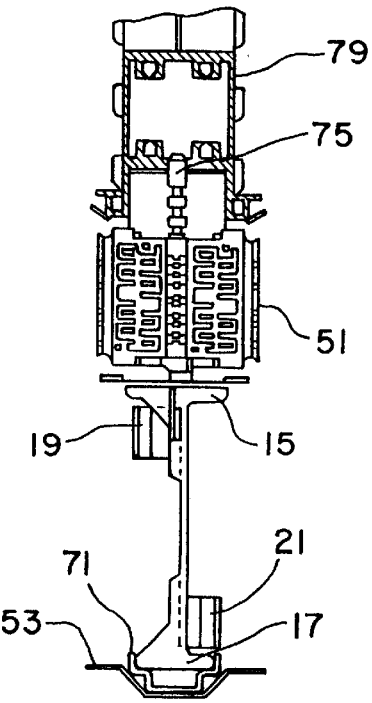
FIG. 9 is an end view partially in cross-section of a distribution unit stabilizing system.

In FIGS. 9–11, an electrical distribution unit 51 having electrical outlets 52 and 54 is shown supported and stabilized over a subordinate horizontally extending channel 53 at one preferred elevation above the channel 53 by a pair of legs 55 and a like leg 57, which are riveted at 59, 61, 63 and 65 to the unit 51 and depend downwardly therefrom. Channel 53 may, for example, be the lowermost channel of a wall panel. The legs 55 and 57 are fastened by screws 67 and 69 to brackets 11 and a like bracket 73. In FIGS. 9–11, the screw 67 rests in slot 23 and threadedly engages the insert 49. The channel engaging foot such as 17 at the lower body end rests in an double U-shaped adapter 71. This adapter 71 adapts the bracket lower end 17 configuration to the contour of the channel 53. Neither the spaced apart pair of channel engaging pads 19 and 21, nor the foot 15 are used in this installation. The distribution unit 51 has a pair of upwardly extending posts 75 and 77 which pass into corresponding holes in the upper channel 79 providing upper stabilization to the distribution unit 51.

Comparing FIGS. 9 and 11 with FIGS. 12 and 13, it will be noted the brackets 11 and 73 have been inverted and screws 67 and 69 now pass through the open-ended slots such as slot 25 and engage the leg insert 49. The foot 15 now rests in a channel 81 of a dissimilar cross-sectional configuration without any intervening adapter such as 71. Channel 81 may, for example, be an intermediate horizontally extending channel of a wall panel. In this case, the outlets 52 and 54 could be located at a convenient desktop elevation rather than one foot or so off the floor as in this examples of FIGS. 9, 11, 14 and 15. The bracket has simply been inverted to now support and stabilize the distribution 51 above a different channel.

Comparing FIGS. 9 and 11 with FIGS. 14 and 15, it will be noted the brackets 11 and 73 have been rotated clockwise about ninety degrees so the pads 19 and 21 rest in the channel 53, again, without any intervening adapter. The screws 67 and 69 now pass through elongated closed slots such as aperture 27 and engage the leg insert 49. The bracket has simply been rotated to now support and stabilize the distribution 51 above, but much closer to, the channel 53. Channel foot 17 engages the channel (by way of adapter 71) when the screw 67 passes through the leg 55 and opening 23 while the pair of channel engaging pads 19 and 21 engage the channel when the screw passes through the leg and elongated opening 27.

The process of installing electrical or other utility distribution units supported and stabilized between two elongated generally parallel channels should now be clear. A plurality of spaced legs 55 and 57 are fixed as by riveting to the distribution 51 with each leg extending transversely to, and in generally the same direction from, the distribution. A plurality of posts 75 and 77 are engaged with the upper channel. The suspension of the distribution from the above channel 79 by the posts 75 and 77 is substantially as known in the prior art and results in excessive pivotal movement when plugs are inserted or removed from the outlets 52 or 54. To avoid this tipping motion, a plurality of mounting brackets 11 and 73 are placed intermediate the distribution 51 and the lower channel 53 or 81 with each mounting bracket adjacent to a corresponding leg. The leg and adjacent bracket are joined at a generally central location of the bracket when the spacing between the first and second elongated members is near a preferred minimum distance with the bracket extending horizontally and parallel to the channels as in FIGS. 14 and 15 while each leg is fastened to the adjacent bracket near an end of the bracket and the bracket extends vertically when the spacing between the first and second elongated members is near a preferred maximum distance.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. The method of supporting and stabilizing an elongated electrical distribution intermediate first and second elongated generally parallel channels comprising the steps of:

fixing a plurality of spaced legs to the distribution with each leg extending transversely to, and in generally the same direction from, the distribution;

engaging a portion of the distribution with the first channel;

introducing a plurality of mounting brackets intermediate the distribution and the second channel with each mounting bracket adjacent a corresponding leg; and fastening each leg to the adjacent bracket at a generally central location of the adjacent bracket when the spacing between the first and second elongated members is near a preferred minimum distance, and fastening each leg to the adjacent bracket near one end of the bracket when the spacing between the first and second elongated members is near a preferred maximum distance.

2. The method of claim 1 wherein each mounting bracket is elongated with an axis of elongation extending generally parallel to the first and second channels when the channel separation is near the preferred minimum distance and extending orthogonal to the direction of elongation of the first and second channels when the channel separation is near the preferred maximum distance.

3. The method of claim 1 including the step of introducing a plurality of U-shaped adapters intermediate each bracket and the second channel to adapt the bracket lower end configuration to the contour of the second channel.

* * * * *